United States Patent [19]

Uramoto et al.

[11] Patent Number: 5,497,340
[45] Date of Patent: Mar. 5, 1996

[54] APPARATUS AND METHOD FOR DETECTING AN OVERFLOW WHEN SHIFTING N BITS OF DATA

[75] Inventors: Shinichi Uramoto; Hideyuki Terane, both of Hyogo, Japan

[73] Assignee: Mitsubishi Denki Kabushiki Kaisha, Tokyo, Japan

[21] Appl. No.: 75,911

[22] Filed: Jun. 14, 1993

Related U.S. Application Data

[63] Continuation of Ser. No. 580,039, Sep. 10, 1990, abandoned.

[30] Foreign Application Priority Data

Sep. 14, 1989 [JP] Japan ..................................... 1-238904

[51] Int. Cl.$^6$ ........................................................ G06F 05/01
[52] U.S. Cl. ........................................ 364/745; 364/715.08
[58] Field of Search ...................... 395/775; 364/715.08, 364/737, 745, 748, 715.04

[56] References Cited

U.S. PATENT DOCUMENTS

| | | | |
|---|---|---|---|
| 4,012,722 | 3/1977 | Gajski et al. ............................. | 395/775 |
| 4,899,304 | 2/1990 | Terane et al. ............................ | 364/745 |
| 4,931,970 | 6/1990 | Cook et al. ........................ | 364/715.08 |
| 4,941,119 | 7/1990 | Moline ..................................... | 364/745 |
| 5,231,600 | 7/1993 | Robidoux et al. ....................... | 364/745 |

*Primary Examiner*—Parshotam S. Lall
*Assistant Examiner*—Richard L. Ellis
*Attorney, Agent, or Firm*—Lowe, Price, LeBlanc & Becker

[57] ABSTRACT

A data comparator detects the coincidence or non-coincidence of the logical states between two adjacent bits of the plural bit input data and applies the comparison result signal to a non-coincident bit detection circuit. A mask generator decodes a shift select signal indicating the amount of shift to produce mask data and applies the produced mask data to a non-coincident bit detection circuit. The non-coincident bit detection circuit masks the output of the data comparator on the basis of the mask data and decides whether or not an overflow is produced from the masked output of the data comparator to output the result of decision.

13 Claims, 8 Drawing Sheets

APPARATUS AND METHOD FOR DETECTING AN OVERFLOW WHEN SHIFTING N BITS OF DATA

This application is a continuation of application Ser. No. 07/580,039 filed Sep. 10, 1990 now abandoned.

BACKGROUND OF THE INVENTION

1. Field of the Invention

This invention relates to an overflow detection circuit and, more particularly, to a circuit detecting an overflow in a shifter which is adapted for shifting bits of input data.

2. Description of the Background Art

In a data arithmetic portion in a microprocessor or a single processor, a shifter is usually provided for shifting bits of input data, in the form of binary codes by moving the digit to which the bits belong.

When the shifter shifts the input data in this manner, errors may be caused in the produced output data. For example, when the input data is "00001010" in two's complement representation (10 in decimal representation) and is shifted toward the left by four bits, the output data turns out to be "10100000" (–96 in decimal representation), which is not correct. The two's complement representation is the method of representing data in which, when the data is negative, the logical states of all the bits are inverted and unity is added to the least significant bit. The most significant bit or MSB is used as the sign bit for indicating the sign, that is the plus or minus of the data. Thus the data is positive or negative when the MSB is 0 or 1, respectively. In the above example, when the original input data "00001010" is shifted towards left by 4 bits, the output data turns out to be "1010000". Thus the fourth bit "1" from the right of the input data is moved after shifting to the position of the most significant bit (MSB) so that the bit data which inherently indicate the figure or numeral now indicates the sign. As a result, an error is produced in the output data. Thus an excess shifting of the input data causes an overflow to produce an error in the output data. This is referred to as an overflow in the shifter.

Therefore, before shifting the input data by the shifter, it is necessary to check if an overflow is caused in the shifter as a result of shifting and to discontinue the shifting operation to prevent the error from being produced in the output data, when it is found that the overflow is caused by the shifter. FIG. 1 is a schematic block diagram showing the arrangement of the overflow detection circuit in the conventional shifter. In this figure, 8-bit data I7 to I0 to be shifted, are entered into a coincidence circuit 31. This coincidence circuit 31 compares the data of the most significant bit and the other bits of the input data and outputs "0" or "1" when the two bits are coincident or not coincident with each other, respectively. Such comparison in the coincidence detection circuit 31 is performed for each of the 7 bits. An inversion of the most significant bit data is added to the least significant bit or LSB of the 7-bit comparison result signal. Thus, when the data entered for shifting is "00001010", for example, the output of the coincident detection circuit 31 proves to be "00010101". This 8-bit signal is entered to a priority rank detector 32.

A priority rank detector 32 is a circuit which sets the bit with the highest priority rank, that is the upper order side bit with the data "1", to "1" and the remaining bits to "0". Thus, when the data entered into the priority rank detector 32 is "00010101", for example, the output of the priority rank detector 32 proves to be "00010000". The output of the priority rank detector 32 is entered into a magnitude comparator 33.

The magnitude comparator 33 decides which of the output signal from the priority rank detector 32 or shift select signals S7 to S0 is larger. The shift select signals S7 to S0 are signals indicating the amount of shift, that is, the number of bits by which the input data is to be moved. A switch select signal in a shift array, for example, is used as the shift select signal. Assuming that the input data is to be shifted toward left by two bits, the shift select signals S7 to S0 prove to be "00100000", for example. When the output of the priority rank detector 32 is larger than the shift select signals S7 to S0, the magnitude comparator 33 decides that an overflow has been caused, and outputs "1". When the output of the priority rank detector 32 is lesser than or equal to the shift select signal, the magnitude comparator 33 decides that an overflow has not been caused, and outputs "0". In the above example, the magnitude comparator 33 decides that an overflow has not been caused and outputs "0" when the amount of leftword shift is 0, 1, 2 or 3, and decides that an overflow has been caused and outputs "1" when the amount of leftword shift is 4, 5, 6 or 7.

FIG. 2 is a logical circuit diagram showing an arrangement of the priority rank detector 32 shown in FIG. 1. In this figure, the priority rank detector 32 is made up of a plurality of OR gates 326 to 320, and a plurality of exclusive OR gates 326' to 320'. When output data X7 to X0 are entered to the priority rank detector 32 from the coincidence detection circuit 31, data comparison is made in the priority rank detector 32 on the bit-by bit basis from the most significant bit. Only the upper order side bit on which "1" appears first becomes non-coincident so that "1" is outputted from the associated exclusive OR gate. Outputs from the remaining exclusive OR gates are "0" since two inputs are coincident in these exclusive OR gates.

With the above described conventional overflow detection circuit, problems are raised that the circuit is formed by a large number of elements and the detection time is protracted. The coincidence detection circuit 31, for example, is made up of a plurality of exclusive OR gates provided for each bit. The priority rank detector 32 is made up of a plurality of OR gates 326 to 320 and a plurality of exclusive OR gates 326' to 320', as shown in FIG. 2. The magnitude detector 33 includes subtractors formed by full adders, each associated with one bit. The exclusive OR gates are in need of a larger number of transistors than in the case of the basic gating circuits such an AND or OR gates. On the other hand, each full adder is in need of at least 24 transistors. Thus the conventional overflow detection circuit shown in FIG. 1 is in need of an extremely large number of transistors since it is formed by a large number of exclusive OR gates and full adders, so that the size and cost of the circuit are increased. Inasmuch as the coincident detection circuit 31 and the priority rank detector 32 are arranged so that signals are propagated bit by bit from the most significant bit to the least significant bit, a delay in signal propagation is caused in dependence upon the number of bits of the processed data. In the magnitude comparator 33, a delay is similarly caused due to chain of carries in the full adders. With the overflow detection circuit shown in FIG. 1, the coincidence detection circuit 31, the priority rank detector 32 and the magnitude comparator 33 are connected in series and hence the delay times in the circuits 31 to 33 are summed together so that the signal propagation time since the application of the input data to the ultimate overflow detection is prolonged resulting in retarded detection. In general, in a microprocessor employing a shifter, the circuit as a whole is driven in synchronism with clocks, so that the delay time of the worst delay route, that is the route having the longest delay time, determines the operating speed performance of the overall circuit. Thus the probability is high that the overflow detection circuit of FIG. 1 proves to be the worst delay route. Hence, there is a risk that the overflow detection circuit of FIG. 1 deteriorates the processing performance of the entire circuit.

SUMMARY OF THE INVENTION

The present invention has been made to overcome the above mentioned inconveniences and hence to provide a overflow detection circuit capable of detecting an overflow at a higher speed with a lesser number of component elements.

A circuit for detecting whether an overflow is or is not caused in shifting bits of binary coded data according to the present invention comprises comparator means for detecting coincidence or non-coincidence of logical states of two adjacent bits in the binary coded data, mask signal generating means for decoding a multibit shift select signal representing the amount of shift to produce a multibit mask signal, masking means for masking the output from the comparator means by a number of bits corresponding to the amount of shift on the basis of the mask signal and means for deciding whether the overflow is or is not caused on the basis of the output from the mask means.

According to the present invention, overflow detection is performed by comparator means, mask signal generating means, masking means and deciding means, each performing an extremely simple logical operation, resulting in a lesser number of the component elements of each of the above means and reduced size and cost of the circuit. The signal propagation time in each of the means is shorter. Inasmuch as the above means are not connected in series as in the case of the conventional overflow detection circuit, the signal propagation time of the entire circuit becomes smaller and the detection time may be shortened.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
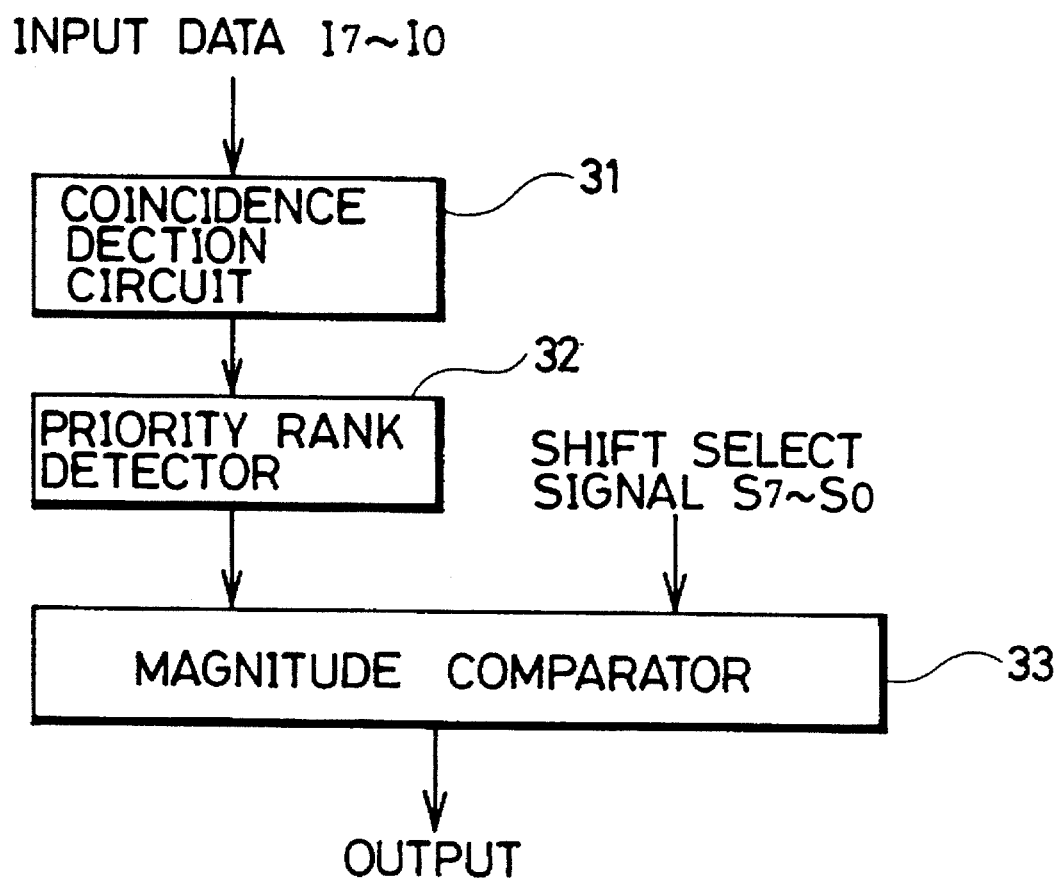
FIG. 1 is a schematic block diagram showing an arrangement of an overflow detection circuit in a conventional shifter.

By referring to the drawings, an embodiment of the present invention will be explained in detail. In the following, an example of an overflow detection circuit in an 8-bit shifter is explained, as in the prior-art example described above. It is however to be understood that the present invention may be applied to a shifter for other than 8 bits.

Figure 3:
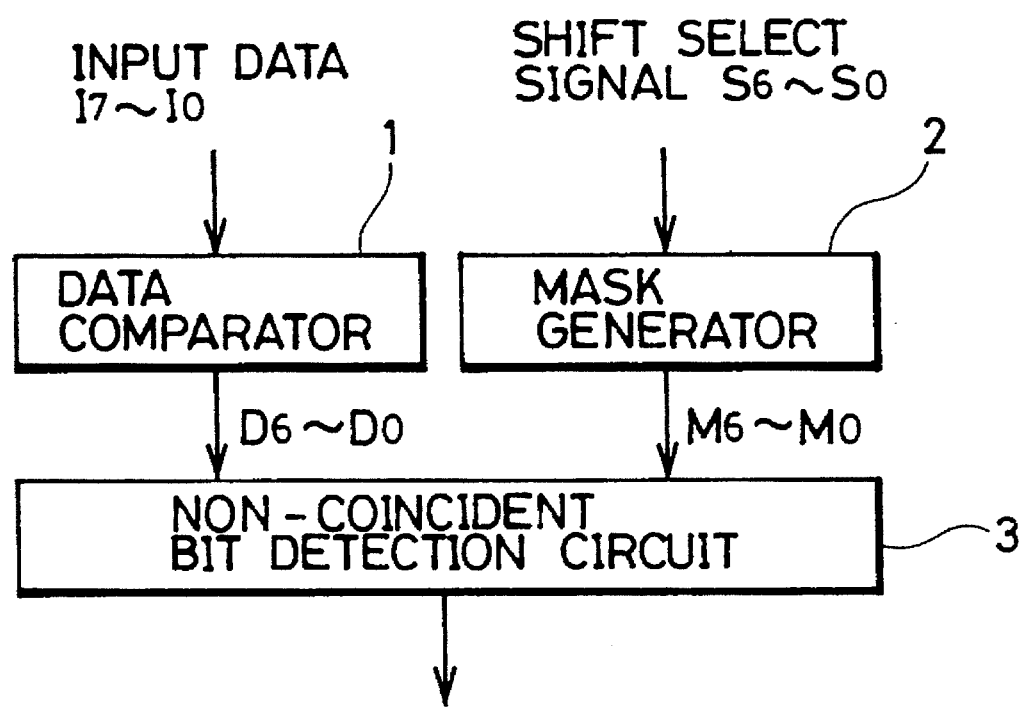
FIG. 3 is a schematic block diagram showing an arrangement of a preferred embodiment of the present invention.

FIG. 3 is schematic block diagram showing an arrangement of an embodiment of the present invention. In this figure, input data I7 to I0 to be shifted are entered into a data comparator 1. This data comparator 1 detects coincidence or non-coincidence between adjacent bits and output a result of the detection. The data comparator 1 thus compares two adjacent bits and outputs "1" and "0" in case of coincidence and non-coincidence between these bits, respectively. Since the comparison is made between the adjacent bits of the 8-bit data, the data comparator 1 outputs 7-bit comparison result signals D6 to D0. Thus, when the data entered to be shifted is "00001010", for example, the output of the data comparator 1 proves to be "1110000". This 7-bit signals D6 to D0 are entered to a non-coincident bit detection circuit 3.

A mask generator 2 is a circuit which decodes the shift select signals S6 to S0 and outputs mask data M6 to M0 necessary for the masking operation of the non-coincident bit detection circuit 3.

The shift select signal S6 to S0 are signals in which has the position of "1" is changed with the number of the bits to be shifted. When the data is shifted two bits toward left, for example, the shift select signals S6 to S0 prove to be "0010000". When the input data is to be shifted by 7 bits toward left, the shift select signal proves to be "0000000" and, when the input data is not to be shifted or to be shifted toward right, the shift select signal proves to be "1000000". When the shift select signal is "0010000", for the example, the mask data M6 to M0 outputted from the mask generator 2 proves to be "0011111". Thus the mask generator 2 decodes the shift select signal so that all of the lower order side bits, as viewed from the most significant bit of the shift select signals S6 to S0, than the bit at which "1" appears first, are set to "1". Meanwhile, when S6=1, that is, when the data is not shifted, overflow is not caused, so that the mask generator 2 outputs mask data "1111111" to mask all the bits. Thus, masking is provided when the mask data M6 to M0 is "1". This mask data M6 to M0 are applied to the non-coincident bit detection circuit 3.

The non-coincident bit detection circuit 3 deems an overflow to take place when there is at least one non-coincident data concerned with overflow in the comparison result signal D6 to D0 outputted from the data comparator 1. However, the portions of the output D6 to D0 of the data comparator 1 that are concerned with the overflow are changed depending on the number of the bits to be shifted, those portions that are not concerned with the overflow are masked by the mask data M6 to M0 outputted from the mask generator 2. Thus the non-coincident bit detection circuit 3 deems an overflow to take when there is a bit indicating non-coincidence, that is, the bit "0", in the output from the data comparator 1 corresponding to the bit string not masked by the non-coincident bit detection circuit 3. Otherwise, the non-coincident bit detection circuit 3 deems no overflow to take place. In the above example, the output D0 to D6 from the data comparator 1 is "111", while the mask data M6 to M0 from the mask generator 2 is "0011111", so that 5 bits from the least significant bit are masked and hence the input data is decided to be free from overflow. However, when the input data is shifted by 4 bits towards left, the mask data M6 to M0 from the mask generator 2 is "1110000", so that "0" is present in a portion of the output from the data comparator 1 which has not been masked by the mask data. In this case, the output portion is "0" at the fourth bit counting from the least significant bit. Thus the overflow is decided to have been produced.

Figure 4:
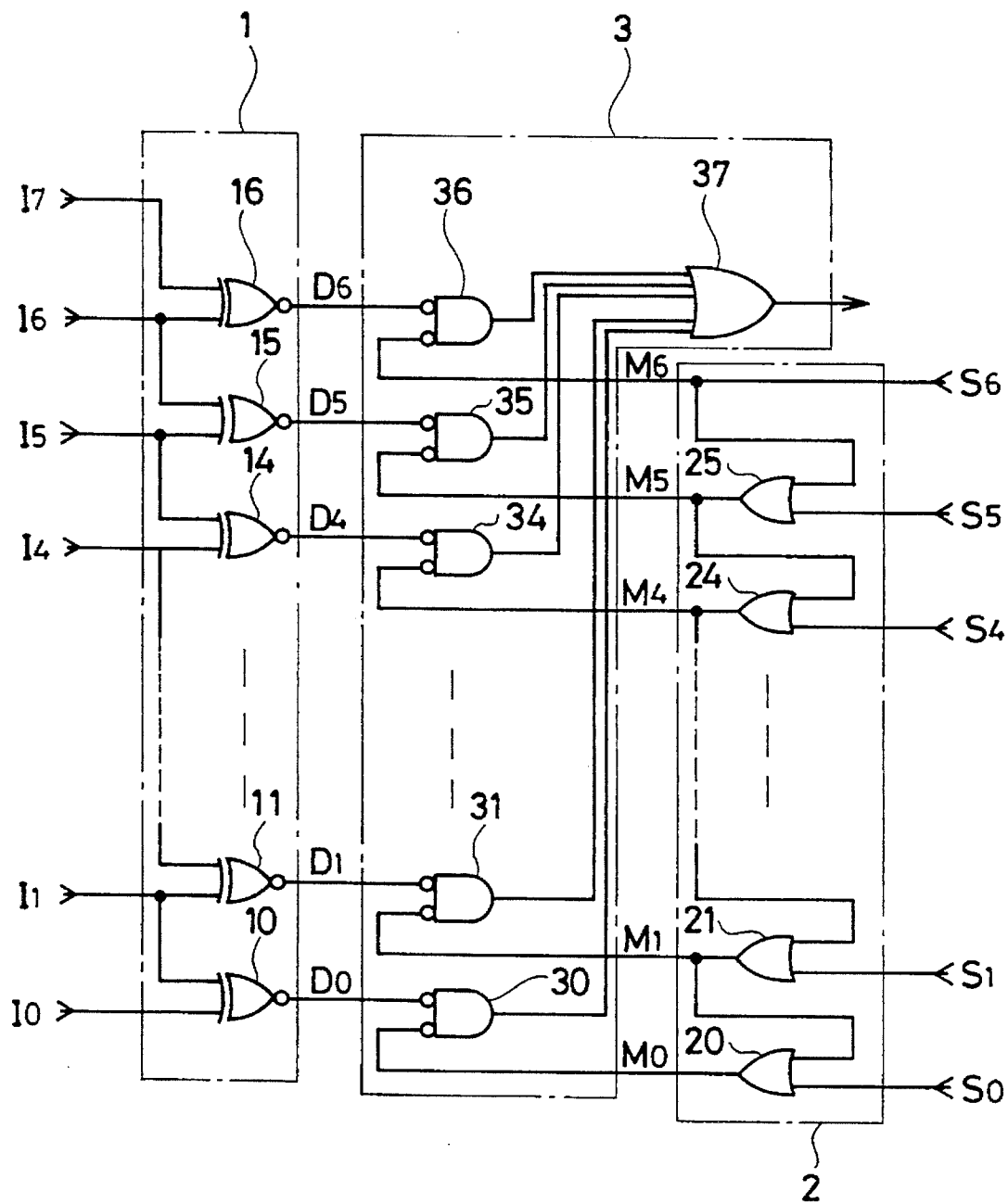
FIG. 4 is a logical gating diagram showing a more detailed arrangement of the embodiment shown in FIG. 3.

FIG. 4 is a logical gating diagram showing a detailed structure of the overflow detection circuit shown in FIG. 3. As shown therein, the data comparator 1 is made up of seven exclusive OR gates 16 to 10 provided between the bits of the input data I7 to I0. The mask generator 2 is made up of six OR gates 25 to 20. The one inputs of the OR gates 25 to 20 are supplied with associated shift select signals S5 to S0. The other input of the most significant bit side OR gate 25 is supplied with the shift select signal S6. The other inputs of the OR gates 24 to 20 are supplied with outputs of the respective adjacent upper order bit side OR gates. Of the mask data M6 to M0 produced by this mask generator 2, the mask data M6 is formed by the shift select signal S6, while the mask data M5 to M0 are produced by the outputs of the OR gates 25 to 20, respectively. The non-coincidence bit detection circuit 3 is made up of seven NOR gates 36 to 30 and one OR gate 37. The one inputs of the NOR gates 36 to 30 are supplied with associated comparison result signals D6 to D0, while the other inputs of these NOR gates are supplied with associated mask data M6 to M0. These NOR gates 36 to 30 mask the output signals D6 to D6 of the data comparator 1 based on the mask data M6 to M0 from the mask generator 2. Outputs of the NOR gates 36 to 30 are supplied to an OR gate 37. The OR gate 37 performs, on the basis of the outputs from the NOR gates 36 to 30, an operation of deciding whether or not an overflow is produced. More specifically, an overflow is decided to be produced when at least one bit of the outputs from the NOR gates 36 to 30 is "1".

Figure 2:
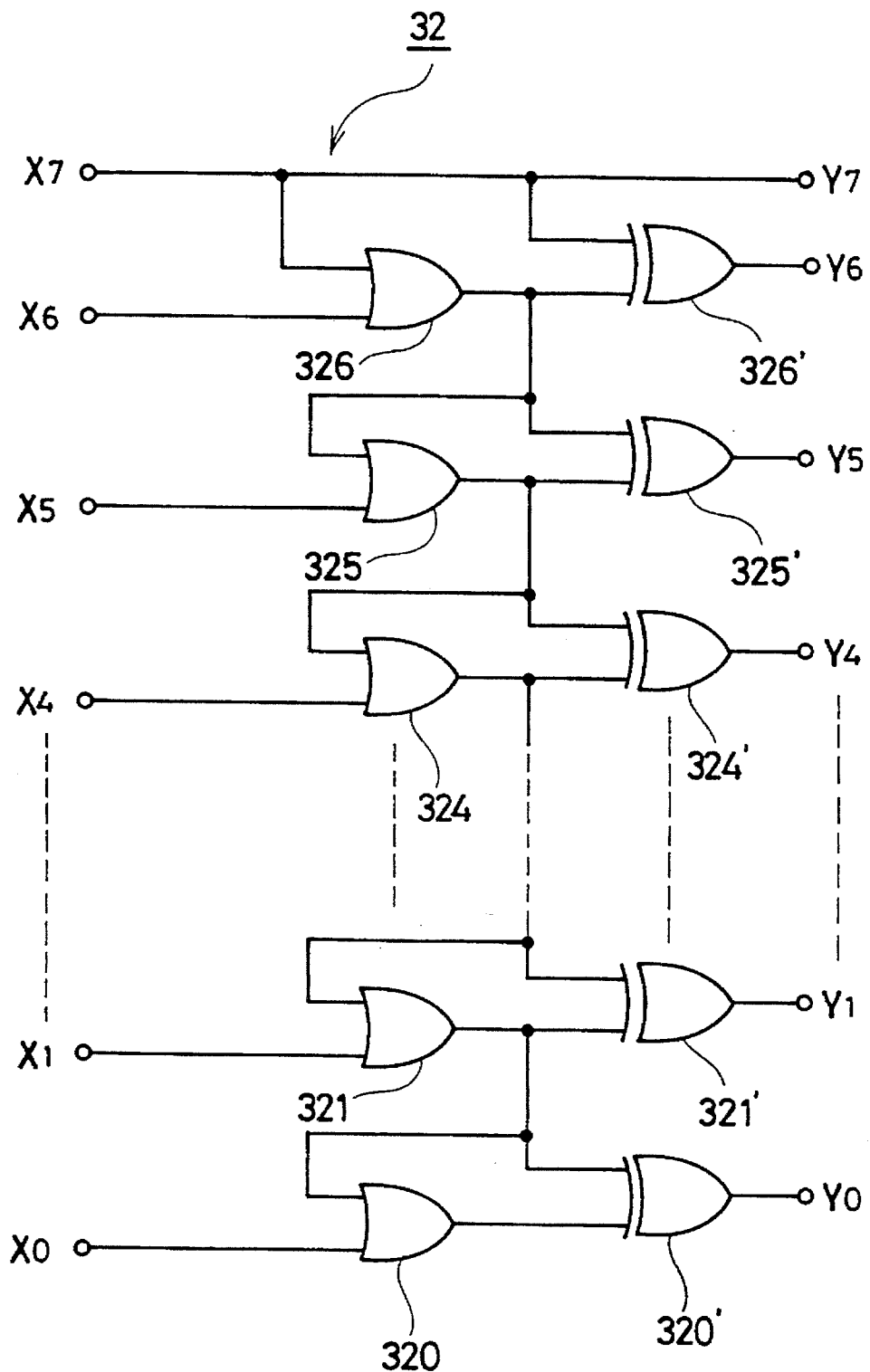
FIG. 2 is a logical gating diagram showing an arrangement of a priority rank detector shown in FIG. 1.

Let us now compare the overflow detection circuit according to an embodiment of the present invention shown in FIGS. 3 and 4 and the conventional overflow detection circuit shown in FIGS. 1 and 2 as to circuit scale and detection speed. Considering first the circuit scale, the overflow detection circuit according to an embodiment of the present invention is substantially comprised of one exclusive OR gate, one NOR gate and one OR gate per bit. This circuit scale corresponds to the circuit scale of the coincidence detection circuit 31 and the priority rank detector 32 in the conventional overflow detection circuit. This means that the circuit scale may be reduced with the overflow detection circuit according to an embodiment of the present invention by a number of devices substantially equivalent to the magnitude comparator 33 as compared with the conventional overflow detection circuit. This magnitude comparator 33 includes subtractors formed by full adders provided for each one bit. Since each full adder is comprised of at least 24 transistors, it is possible with the overflow detection circuit of one embodiment of the present invention to reduce the circuit scale significantly as compared with that of the conventional overflow detection circuit. Then, considering the detection speed, the signal propagation time in the mask generator 2 is longer than that in the data comparator 1 in the overflow detection circuit of the present invention. The reason is that the signal propagation time of one logical gate per bit is required with the data comparator 1, whereas the signals must propagate sequentially with the mask generator 2 through six OR gates 25 to 20, at the maximum, until the mask data M0, or the least significant bit, is established. Thus the detection speed of the overflow detection circuit according to the present embodiment of the present invention is the sum of the signal propagation time in the mask generator 2 and that in the non-coincident bit detection circuit 3. The signal propagation time in the non-coincident bit detection circuit 3 corresponds to that of two logical gates, that is, a NOR gate and an OR gate per each bit. Such signal propagation time in the overflow detection circuit in the present embodiment is substantially equivalent to the signal propagation time in the coincidence detection circuit 31 and the priority rank detector 32 in the conventional overflow detection circuit. Thus the detection speed of the overflow detection circuit with the present illustrative embodiment is faster than the detection speed of the conventional overflow detection circuit by a delay time corresponding to chain of carries in the magnitude comparator 33, so that a faster overflow detection may be achieved.

As described hereinabove, it is possible with the overflow detection circuit of the embodiment shown in FIGS. 3 and 4 to reduce the circuit scale as well as to achieve faster detection speed than in the case of the conventional overflow detection circuit. However, this embodiment is not wholly satisfactory in that the signal propagation time in the mask generator 2 is longer than that in the data comparator 1 and in the non-coincidence bit detection circuit 3. Above all, when the number of the bits in the processed data is increased, a problem is presented in that the signal propagation time in the mask generator is increased.

An embodiment in which a so-called look-ahead system is adapted in the mask generator 2 to improve the operational speed of the entire circuit is explained hereinbelow.

Figure 5:
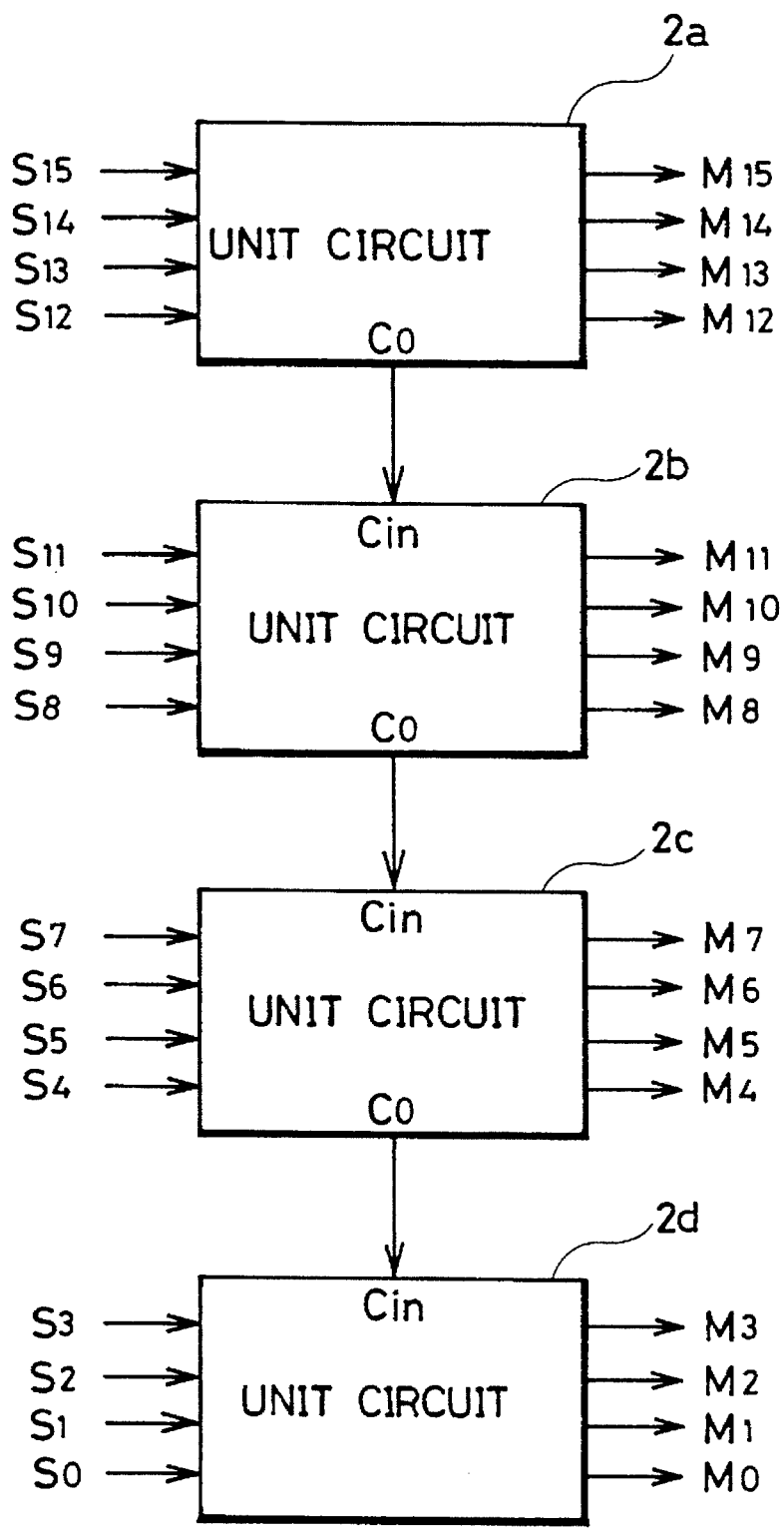
FIG. 5 is a block diagram showing an example of an arrangement of a mask generating circuit according to a so-called look-ahead system.

FIG. 5 is a block diagram showing an embodiment of the construction of the mask generator in accordance with the look-ahead system. In this figure, the mask generator includes, for generating 16-bit mask data M15 to M0, four unit circuits 2a, 2b, 2c and 2d to which are allotted 4 bits each of the 16 bits. A look-ahead output Co is derived from each unit circuit so as to be applied as a look-ahead input Cin to the adjacent lower order bit side unit circuit.

Figure 6:
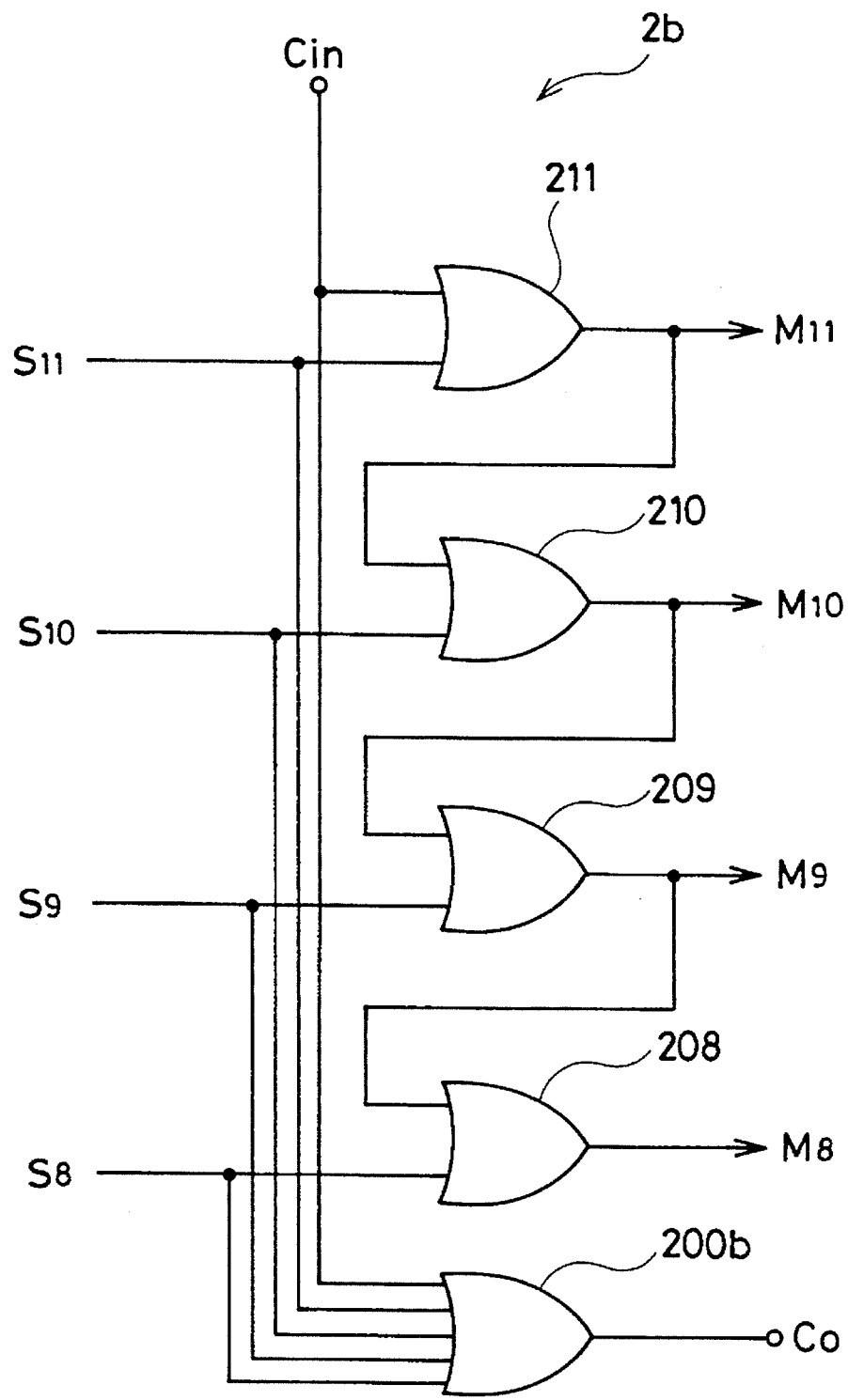
FIG. 6 is a logical gating diagram showing an arrangement of a unit circuit shown in FIG. 1.

FIG. 6 is a logical gating diagram showing the construction of the unit circuit 2b shown in FIG. 5. According to FIG. 6, this unit circuit 2b includes OR gates 211 to 208 for generating the mask data and an OR gate 200b for generating the look-ahead output. The one inputs of the OR gates 211 to 208 are supplied with associated shift select signals S11 to S8. The other input of the most significant bit side OR gate 211 is supplied with the preview input Cin from the upper order bit side unit circuit 2a. The other inputs of the OR gates 210 to 208 are supplied with the outputs of the upper order bit side OR gates. The outputs of these OR gates 211 to 208 turn out to be the mask data M11 to M8. The OR gate 200b for look-ahead output generation is supplied with the look-ahead input Cin from the upper order bit side unit circuit 2a, as well with the shift select signals S11 to S8.

It is noted that the unit circuit 2c has the structure similar to that of the unit circuit 2b shown in FIG. 6. The unit circuit 2a, having the construction substantially similar to that of the unit circuit 2b shown in FIG. 6, is not provided with an OR gate corresponding to the OR gate 211. Thus the shift select signal S15 is directly derived as the most significant bit signal M15 of the mask data. The unit circuit 2d, having the construction similar to that of the unit circuit 2b shown in FIG. 6, is not provided with an OR gate corresponding to the OR gate 200b.

With the above described construction of the unit circuits shown in FIG. 6, the following logical equations are satisfied.

$$M11 = Cin + S11$$

$$M10 = Cin + S11 + S10$$

$$M9 = Cin + S11 + S10 + S9$$

$$M8 = Cin + S11 + S10 + S9 + S8$$

$$Co = Cin + S11 + S10 + S9 + S8$$

It will be seen from the above logical equations that when at least one of the input signals S11 to S8 and Cin to the unit circuit 2b is "1", this is reflected in the look-ahead output Co which is applied to the lower bit side unit circuit. Thus the following logical output is obtained with the mask generator as a whole shown in FIG. 5.

$$Mn = S15 + S14 + S13 + \ldots + Sn$$

Figure 7:
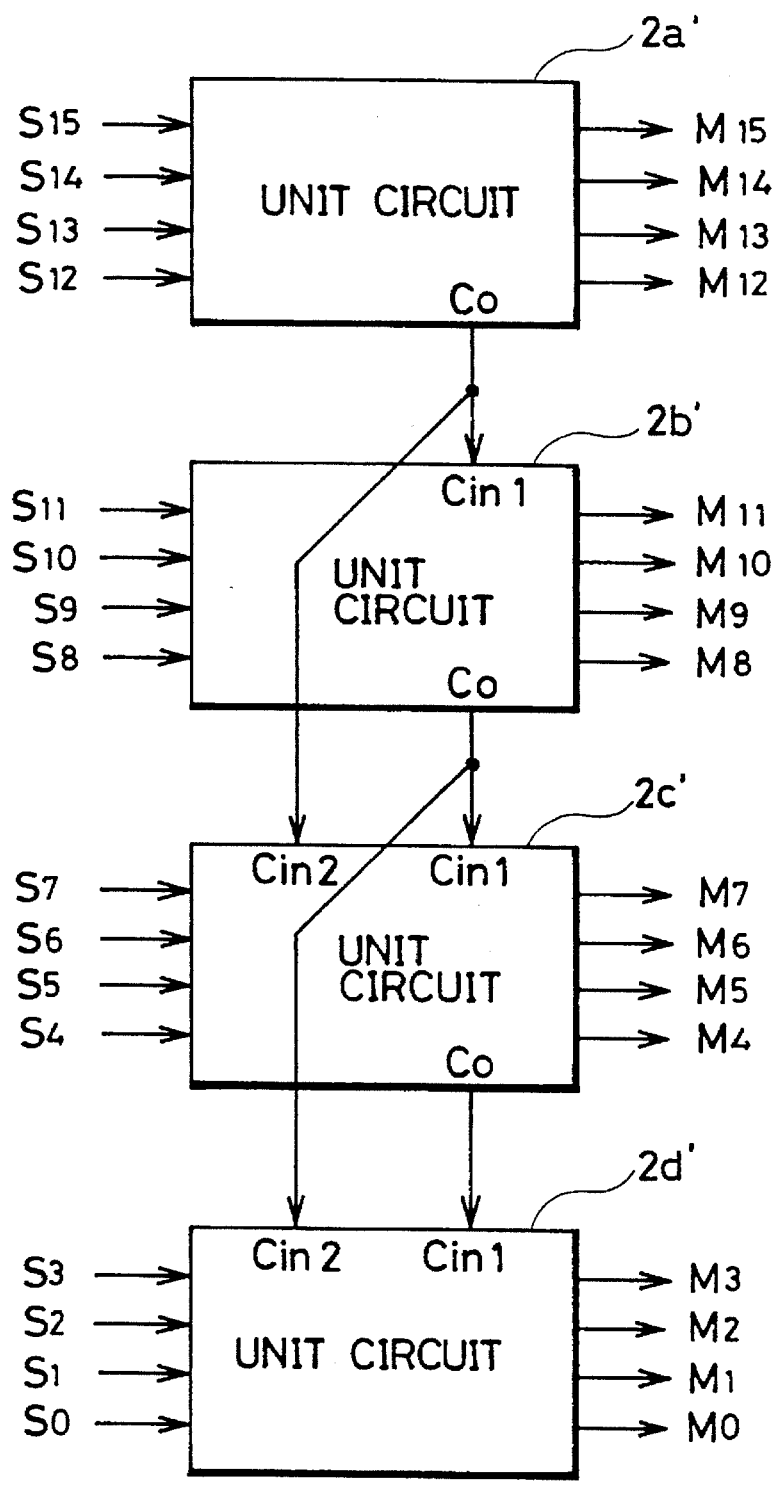
FIG. 7 is a block diagram showing a modified example of a mask generating circuit according to a so-called preview system.
Figure 8:
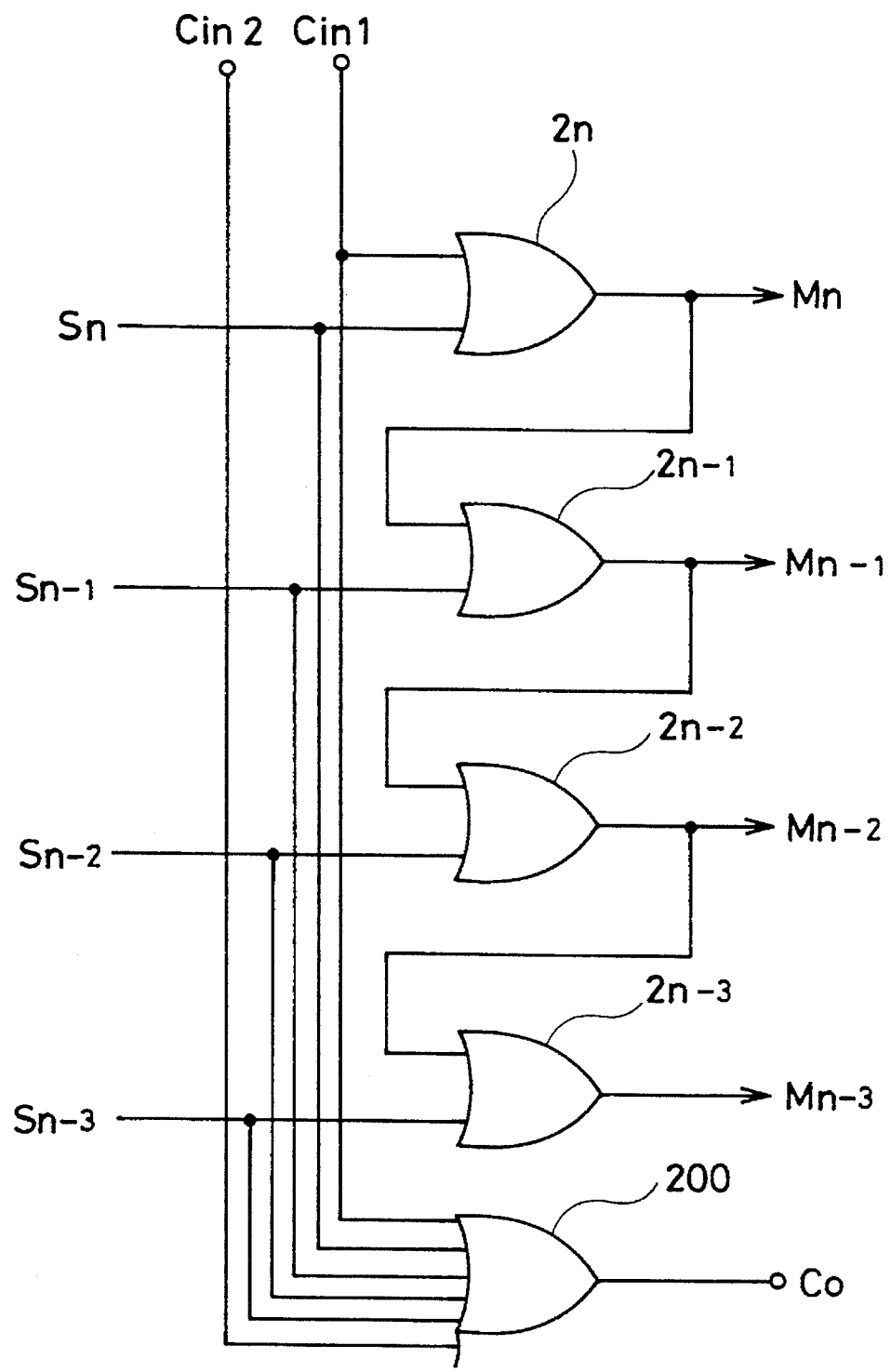
FIG. 8 is a logical gating diagram showing an arrangement of a unit circuit shown in FIG. 7.

Although only one look-ahead input Cin is applied to each unit circuit in the mask generator shown in FIG. 5, plural look-ahead inputs may also be applied to the unit circuits. For example, when two look-ahead inputs Cin 1 and Cin 2 are applied to the unit circuits, as shown in FIG. 7, each unit circuit is constructed as shown in FIG. 8. As shown therein, the arrangement of FIG. 8 is similar to that of the unit circuit shown in FIG. 6 except that the look-ahead inputs Cin 1 and Cin 2 are applied from the upper bit side two unit circuits to the look-ahead output generating OR gate 200.

With the mask generator shown in FIG. 5 or 7, the lower bit side unit circuits may be set into operation quickly by the look-ahead input applied from the upper order bit side unit circuits, so that the signal propagation time becomes shorter than that in the mask generator 2 shown in FIG. 2 so that a faster operation is achieved.

From the foregoing it is seen that the present invention provides an overflow detection circuit formed by a lesser number of elements or devices than in the conventional overflow detection circuit, so that an area on the integrated circuit is reduced correspondingly. Also, a faster overflow detection may be achieved due to the shorten signal propagation time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of detecting an overflow when shifting bits of n bits of binary coded data in a circuit having a plurality of logical gates, the method comprising the steps of:

inputting n-bits of a first data to said plurality of logical gates;

comparing logical states of all adjacent bits of said n-bits of said first data and outputting n−1 bits of a second data, a respective bit of said n−1 bits of said second data being of a first level when said logical states of two adjacent bits of said n-bits of said first data are the same and a second level when said logical states are different;

masking a predetermined number of bits of n−1 bits of a shift select signal representing a number of bits to be shifted to generate n−1 bits of mask data, a masked bit being set to said first level and said predetermined number being a function of the number to be shifted;

comparing each bit of n−1 bits of said second data with a corresponding bit of said mask data; and outputting one of an overflow indication when said step of comparing indicates that both a non-masked bit of said mask data and a corresponding bit of said second data are set to said second level and a no overflow indication when said non-masked bit of said mask data and a corresponding bit of said second data are set to said first level.

2. A circuit for detecting an overflow when shifting bits of n bits of binary coded data comprising:

means for comparing logical states of all adjacent bits of said n bits of binary coded data to detect coincidence and outputting n−1 bits of binary coded data, a respective bit of said n−1 bits of binary coded data being of a first level when said logical states of two adjacent bits of said n bits of binary coded data coincide and a second level when said logical states do not coincide;

mask signal generating means for receiving a shift select signal representing a number of bits to be shifted and generating an n−1 bit mask signal, said mask signal having non-masking bits at bit positions above the number equal to said number of bits to be shifted and having masking bits at the remaining lower bit positions;

masking means for masking said n−1 bits of binary coded data with said masking bits of said n−1 bit mask signal; and indicating means for outputting an overflow indication when any bit of non-masked bits of said n−1 bits of binary coded data is equal to said second level.

3. The circuit according to claim 2, wherein said shift select signal includes an n−1 bit shift select signal having a bit of a predetermined level at the bit position corresponding to said number of bits to be shifted and having bits of another level at the remaining bit positions.

4. A circuit for detecting an overflow when shifting bits of n bits of a first data comprising:

comparator means for comparing logical states of each bit with an adjacent bit of said n bits of said first data to determine whether immediately adjacent bits have same logical states or different logical states and outputting n−1 bits of a second data, a respective bit of said n−1 bits of said second data being of a first logical state when said comparator means determines that the adjacent bits of said n bits of said first data have the same logical states and a second logical state when said comparator means determines that the adjacent bits of said n bits of said first data have different logical states;

mask signal generating means for receiving n−1 bits of a shift select signal representing a number of bits of said first data are to be shifted and outputting n−1 bits of a mask data with a predetermined number of bits being masked so that a masked bit has the first logical state, said predetermined number being a function of the number of bits to be shifted;

means for detecting an overflow based on said mask data of said mask signal generating means and said second data of said comparator means.

5. The circuit according to claim 4, wherein said comparator means comprises a first plurality of logical gates, each logical gate respectively receiving two adjacent bits of the n bits of said first data to be shifted and outputting one of said n−1 bits of said second data.

6. The circuit according to claim 5, wherein said detecting means means includes a second plurality of logical gates, each logical gate of said detecting means respectively receiving corresponding one of said n−1 bits of said second data output from one of said first plurality of logical gates of said comparator means and a bit of said mask data, said corresponding one of said n−1 bits of first data and said bit of said mask data having a same bit position.

7. The circuit according to claim 6, wherein said first plurality of logical gates of said comparator means are exclusive OR gates and said second plurality of logical gates of said detecting means are NOR gates and at least one OR gate, and outputs of said NOR gates are coupled to inputs of said at least one OR gate.

8. The circuit according to claim 4, wherein said mask signal generating means includes a plurality of unit circuits, each unit circuit receiving a predetermined number of bits of said shift select signal, outputting a corresponding number of bits of said mask data, and including a plurality of OR gates, each OR gate outputting one bit of said mask data, a predetermined number of said plurality of OR gates each respectively receiving a bit of said shift select signal having a same bit position as the bit of said mask data output by said each OR gate and the output of one of said plurality of OR gates of an adjacent upper order bit; and each of a predetermined number of unit circuits including a look-ahead OR gate for providing a look-ahead output, each look-ahead OR gate respectively receiving said predetermined number of bits of said shift select signal and an output of another look-ahead OR gate provided in a unit circuit for upper order bits, said look-ahead output being supplied as inputs to the plurality of OR gates and the look-ahead OR gate provided in another unit circuit for lower order bits.

9. The circuit according to claim 4, wherein said mask data has non-masked bits above a bit position determined by said number of bits to be shifted, and said mask signal generating means comprises a plurality of logical gates, each logical gate outputting a respective bit of said mask data based on at least one of a corresponding shift select signal and an adjacent upper order bit of said mask data.

10. The circuit according to claim 9, wherein said plurality of logical gates are OR gates.

11. The circuit according to claim 4, wherein said detecting means comprises:

masking means for masking said n−1 bits of said second data with said masked bits of said mask data and outputting a third data having masked bits and non-masked bits; and indicating means for outputting an overflow indication when any bit of said non-masked bits of said third data has a logic state different from that of said masked bits.

12. The circuit according to claim 11, wherein said masking means comprises a plurality of NOR gates and said deciding means comprises at least one OR gate, outputs of said plurality of NOR gates being coupled to inputs of said at least one OR gate.

13. A method for detecting an overflow when shifting bits of n bits of binary coded data, the method comprising the steps of:

comparing logical states of all adjacent bits of said n bits of binary coded data to detect coincidence and outputting n−1 bits of binary coded data, a respective bit of said n−1 bits of binary coded data being of a first level when said logical states of two adjacent bits of said n bits of binary coded data coincide and a second level when said logical states do not coincide;

receiving a shift select signal representing a number of bits to be shifted and generating an n−1 bit mask signal, said mask signal having non-masking bits at bit positions above the number equal to said number of bits to be shifted and having masking bits at the remaining lower bit positions;

masking said n−1 bits of binary coded data with said masking bits of said n−1 bit mask signal; and outputting an overflow indication when any bit of non-masked bits of said n−1 bits of binary coded data is equal to said second level.

* * * * *